WAVESHAPES OF COUNTERS & FLIP-FLOP

Inventor
Walter R. Seegmiller
by Paul A. Frank
His Attorney

HYBRID DIGITAL-ANALOG CIRCUIT

Filed May 31, 1962 2 Sheets-Sheet 2

Inventor
Walter R. Seegmiller
by Paul A. Frank
His Attorney

United States Patent Office 3,263,066
Patented July 26, 1966

3,263,066

HYBRID DIGITAL-ANALOG CIRCUIT

Walter R. Seegmiller, Scotia, N.Y., assignor to General Electric Company, a corporation of New York Filed May 31, 1962, Ser. No. 198,889
10 Claims. (Cl. 235—150.5)

My invention relates to an electronic circuit, and in particular, to a hybrid digital-analog circuit employing analog signals as the input and output quantities and digital signals for performing computation and control functions within the circuit.

Systems which are employed for computation and control purposes may broadly be designated as analog and digital systems. An analog system utilizes numbers represented by directly measurable quantities such as voltage or current. The voltage or current in turn represents a direct measure or analog of a physical quantity being studied. A digital system on the other hand utilizes numbers expressed directly as digits in a decimal, binary or other counting system. These digits in turn represent a physical quantity under study. In general, physical quantities such as velocity, angle or position are most conveniently and directly obtainable in analog form and not in digital form. Pulses of electrical energy may be employed in either an analog or digital system, the characteristics of a pulse such as duration or amplitude determining the analog quality, and the presence or absence of a pulse determining the digital quality.

Analog computation and control systems conventionally use electromechanical servomotors with tachometers geared to synchros, which are rotatable electromagnetic devices whose output is determined by the angular position of a rotor, and potentiometers for integration, long term memory, and multiplication operations. These electromechanical components have moving parts which wear out and become a source of many problems in reliability, particularly in air-borne systems. Other conventional analog circuits employ electronic amplifiers and the storage of charge on a capacitor especially for memory operational modes. Parameters of these components vary with age, temperature and physical impact to effect an undesirable and slowly developing change or long-term drift in the output during this memory mode. The reliability problem has been solved to a certain extent by performing the computation and control functions with digital techniques and then employing special electrical networks for converting the digital numbers to an analog quantity. These networks, commonly called ladder switching networks, employ an elaborate chain of interconnected precision resistors, the interconnection being varied by switching devices to provide an output in analog form. Since the ladder switching networks are often very complex, a need exists for solving the reliability problem in another manner. The common use of electrical pulses in both digital and analog circuits suggests providing a hybrid digital-analog computation and control system wherein many of the conventional electromechanical components are replaced with simple and reliable electronic circuits.

Therefore, one of the principal objects of my invention is to develop an improved hybrid digital-analog computation and control system employing electronic circuits for obtaining a more reliable and longer life system.

Another important object of my invention is to develop an improved hybrid digital-analog computation and control system that is constructed of simple and reliable electronic circuits without employing elaborate ladder switching networks.

Still another important object of my invention is to develop an improved hybrid digital-analog computation and control system that develops no long term drift during a memory operational mode.

A further important object of my invention is to develop an improved hybrid digital-analog computation and control system which may perform analog multiplication, gain changing, or act as an integrator.

Briefly stated, and in accordance with one aspect of my invention in meeting the objects enumerated above, I provide an electronic circuit comprising two pulse counters which are actuated by a high frequency pulse source to run in synchronism in the absence of any control action that may be initiated by an analog input signal to the circuit. Control action is obtained in a pulse gate circuit which renders one of the pulse counters responsive to an analog input signal by blocking or adding pulses to the train of high frequency pulses that enter that counter. The control action effects a phase displacement between the two outputs of the pulse counters which is detected by a bistable circuit employed to develop a pulse-width modulated analog signal that may be utilized in a feedback circuit to establish an electronic servomechanism control system.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are identified by the same reference character, and wherein:

Figure 1:
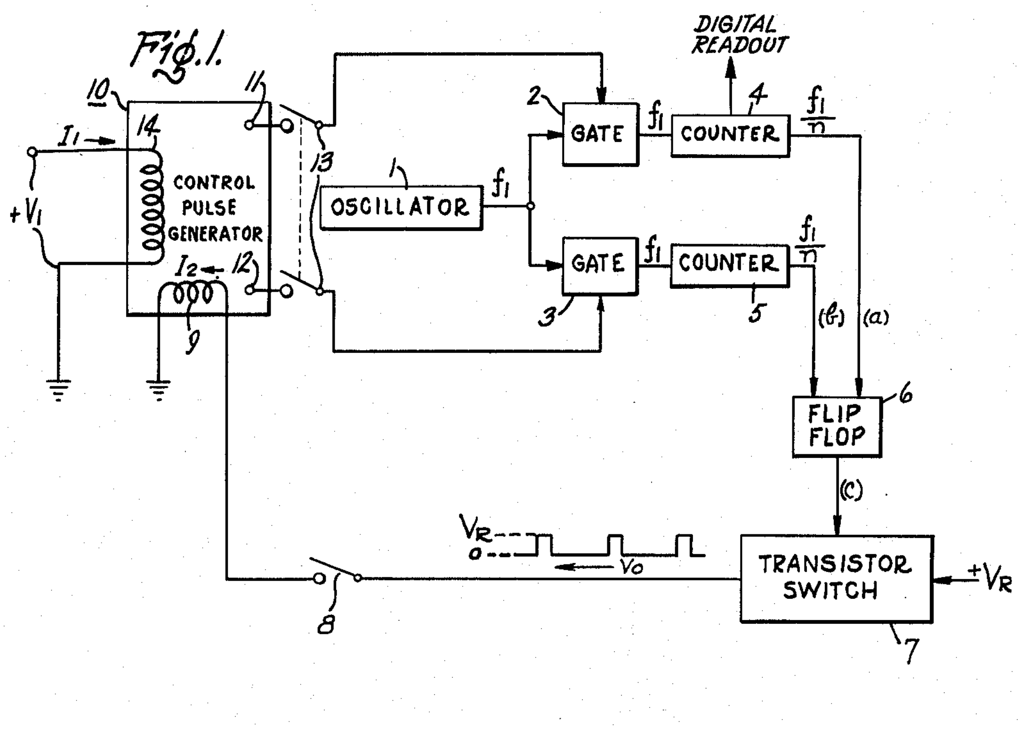
FIGURE 1 is a functional block diagram of a twin pulse gate embodiment of a hybrid digital-analog circuit constructed in accordance with my invention.
Figure 2:
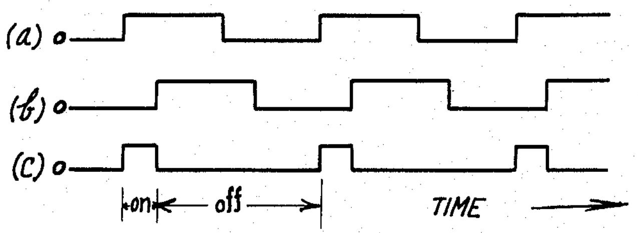
FIGURE 2 is a plot of the waveshapes obtained at the outputs of the counters and a bistable circuit during an interval of time after control action is obtained.

Referring particularly to the block diagram illustrated in FIGURE 1, there is shown an oscillator designated by numeral 1 which acts as a relatively high frequency pulse source. Oscillator 1 may comprise a multivibrator circuit or any conventional electronic circuit which can generate a continuous series of high frequency pulses. The output of oscillator 1 is a pulse train of fixed frequency $f_1$ which by way of example may be single polarity pulses having a 500 k.c. repetition rate. The output of oscillator 1 is connected to a first input of pulse gate circuits 2 and 3, and each gate circuit may comprise what is conventionally known as a single-shot transistor pulse gate circuit although other suitable pulse gating circuits may be employed. Gate circuits 2, 3 are adapted to pass the oscillator frequency $f_1$ to pulse counter circuits 4 and 5 respectively. The pulse counter circuits are identical conventional automatically resetting (free-running) binary count-down circuits, each circuit composed of a chain of flip-flop elements. A flip-flop element is a bistable device, the output of which is some quantity or zero as determined by the presence of a pulse at one of its two input terminals. It should be understood that other counters and other counting systems may readily be used. The output of each counter is a unipolarity square wave with relatively low frequency, $f_1/n$, where $n$ is the count-down ratio of the counters, that is, the number of $f_1$ pulses required to fill up the counter and automatically begin a new count to initiate the next output pulse. By way of example, $f_1/n$ may conveniently be 488 c.p.s. for a binary count-down ratio of 1024 to 1. The outputs of the two counter circuits 4 and 5 are connected as inputs to a suitable circuit 6 which is adapted to detect any phase difference between the two series of relatively low frequency $f_1/n$ pulses transmitted by the counters and provide a pulse-width modulated output wherein the pulse width or pulse duration is equal to the phase displacement between the two series of pulses transmitted by the counters. This circuit may appropriately be a conventional flip-flop circuit by way of example. FIGURES 2(*a*) and 2(*b*) represent output pulses of counters 4 and 5, respectively, the pulses being phase displaced from each other by a time interval determined by a control action to be hereinafter described. FIGURE 2(*c*) illustrates the pulse-width modulated output of flip-flop circuit 6 in response to the input pulses of FIGURES 2(*a*) and 2(*b*). The output of flip-flop circuit 6 is connected as a first input to a switching device which may comprise a conventional transistor switch circuit 7. A reference voltage $V_R$ is connected as a second input to the transistor switch. The flip-flop output thus drives transistor switch 7 with the on-time and off-time pattern illustrated in FIGURE 2(*c*) and results in a transistor switch output $$V_0=V_R\left(\frac{t_{on}}{t_{on}+t_{off}}\right)$$

where $t_{on}$ and $t_{off}$ are the on-time and off-time durations of the transistor switch, and are substantially equal to the on-time and off-time pattern of the flip-flop output. The output of switching device 7 is a pulse-width modulated analog voltage and the average value of this voltage $V_0$ may be used as a feedback voltage and connected through feedback switch 8 to a control winding 9 in a control pulse generator designated as a whole by numeral 10.

Control action is initiated by control pulse generator 10 which comprises any conventional circuit adapted to respond to an analog signal as an input and provide a pulse-width modulated output, the width or duration of the pulse output being proportional to the magnitude of the analog input signal and the polarity of the pulse output being determined by the polarity of the analog input signal. A convenient circuit to accomplish the heretofore described function may consist of a half wave push-pull magnetic amplifier firing circuit which is used to render conductive two controlled rectifiers. Analog signals applied to control windings 9 and 14 of the magnetic amplifier advance the conduction or firing angle of one controlled rectifier and retard the firing angle on the other, thereby producing a pulse-width modulated output signal with a fixed amplitude as determined by a suitable voltage limiting circuit incorporated therein. Control winding 14 is connected to an input analog control signal $V_1$. The output of control pulse generator 10 is thus a pulse-width modulated output having a fixed amplitude and comprising a pulse or series of control pulses of variable duration and which may be of either polarity, an output of one polarity being available at output terminal 11 and an output of the other polarity being available at output terminal 12. A mutually coacting memory-mode switch 13 permits the output of control pulse generator 10 to be connected as a second input to pulse gate circuits 2 and 3 in a manner to be hereinafter described in greater detail.

The computation and control system functions in the following manner. In the absence of any analog signals applied to control windings 9 or 14, or with switch 13 in the open position, the pulses from oscillator 1 pass through pulse gate circuits 2 and 3 and into pulse counters 4 and 5. Counters 4 and 5 run continuously and since each counter is identical, the two counters will run in sychronism, fill up after *n* pulses enter each counter, automatically reset and begin counting again. Since the two counters run in synchronism, there will be no output from flip-flop circuit 6 and correspondingly no output from transistor switch 7.

Control action is obtained when an input analog control signal is applied to control winding 14 or when an analog feedback signal is applied to control winding 9 of the magnetic amplifier element of control pulse generator 10. The analog signal causes generator 10 to generate a single or series of control pulses as hereinbefore described, the pulse duration and polarity of the control pulses being determined by the net ampere turns developed in control windings 9 and 14. It should be apparent that my invention is not limited to using bipolarity control pulses, in fact, it is often preferable to employ only unipolarity control pulses since identical pulse gate circuits 3 and 4 may then be utilized. Thus, control pulse generator 10 may easily be adapted to generate control pulses of one polarity at terminal 12 in response to net positive ampere turns developed in the control windings, and to generate control pulses of the shame polarity at terminal 11 in response to net negative ampere turns. For example, assume that a positive input analog control signal of voltage $V_1$ causes a current $I_1$ to flow in control winding 14, developing positive ampere turns, and there is no current in winding 9. The polarity of control pulse generator 10 is assumed to be such that positive ampere turns produce a control pulse, having a duration proportional to the magnitude of the input analog signal, at terminal 12. With switch 13 closed, the control pulse output from terminal 12 is supplied as an input to pulse gate circuit 3. The effect of this control pulse on gate 3 is to momentarily block one or more pulses from oscillator 1 from entering pulse counter 5, the number of oscillator pulses of frequency $f_1$ blocked being directly proportional to the width or duration of the control pulse. By way of example, a two microsecond control pulse may block one 500 k.c. pulse from oscillator 1. This blocking action delays the output of counter 5 relative to counter 4 as shown in FIGURES 2(*b*) and 2(*a*), respectively, and these two counter outputs thereby produce a flip-flop pattern or switching time ratio of on- and off-times, at the output of flip-flop circuit 6 as illustrated by FIGURE 2(*c*). Transistor switch 7, which is connected to both the output of flip-flop circuit 6 and a reference voltage $V_R$, produces as an output an analog pulse-width modulated output signal $V_0$ having substantially the same on- and off-time pattern or switching time ratio as the flip-flop circuit 6 and a magnitude of voltage $V_R$. If feedback switch 8 is closed, the output of transistor switch 7 causes a current $I_2$ to flow in control winding 9, resulting in negative ampere turns to oppose the positive ampere turns in winding 14. The control pulse generator 10 continues to produce blocking pulses at terminal 12 until the condition is reached that the ampere turns in winding 9 equal the ampere turns in winding 14. At this time $V_0$, the output of switch 7 is proportional to, or an analog of input signal $V_1$. Now, assume that the polarity of voltage $V_1$ is reversed. The resulting negative ampere turns produce control pulses at terminal 11 and are supplied to gate 2. This action blocks one or more pulses of frequency $f_1$ from entering counter 4 which reduces the relative on-time of flip-flop circuit 6 and transistor switch 7. The control pulse generator continues to produce blocking pulses at terminal 11 until the net average ampere turns is again zero. It is obvious that this device is similar in action to an electromechanical position servo, and the average value of the output of transistor switch 7 corresponds to the pick-off voltage of a follow-up potentiometer, synchro or other type of inductive pick-off device. It should also be obvious that a pulse-adding rather than blocking action can be employed to obtain the control action heretofore described.

With no output from the control pulse generator 10, or with memory mode switches 13 open, no control pulses are supplied to the pulse gate circuits 2 or 3. In this case, the flip-flop output switching time ratio repeats itself continuously, the system thereby operating in a memory mode, with the output directly available in pulse-width modulated form at a fixed repetition rate. The outstanding feature of this circuit configuration is that the memory is of a digital nature, and the output may be converted by a simple flip-flop circuit and transistor switch into a pulse-width modulated analog form. This eliminates the need for elaborate ladder switching networks used in conventional forms of digital-to-analog conversion.

Several other applications of the herein described system are possible. As suggested heretofore, the system may be used as an analog memory. For this application, an accurate voltage reference $V_R$ is required. The output of transistor switch 7 is driven until the condition is reached wherein the ampere turns in winding 9 equal the ampere turns in winding 14 by closing feedback switch 8. Memory mode switch 13 is then opened and the output of transistor switch 7 thus is proportional to an analog of input signal $V_1$ and holds this output as a drift-free memory while switch 13 remains open.

The system may also be used as a gain changing device. In this case, feedback switch 8 is left open and the analog input signal $V_1$ is used to change the gain of the open loop in response to programmed gain change commands or in response to an adaptive control sensor. The relative gain of the loop is thus set by the $t_{on}/t_{on}+t_{off}$ ratio of transistor switch 7.

The system may also be utilized as an analog multiplier. With the memory mode switch 13 and feedback switch 8 all closed, the output of transistor switch 7 is proportional to analog input voltage $V_1$. If another similar transistor switch is driven in parallel with transistor switch 7 and a voltage $V_2$ is applied to this second transistor switch, the output of this second switch is proportional to the product of $V_1$ and $V_2$.

The system may also be employed as an integrator. The control pulse generator 10 is designed such that the number of pulses of frequency $f_1$ that are blocked in either of the gate circuits in a given time interval is proportional to the magnitude of input analog signal $V_1$. With feedback switch 8 open, an integrating action occurs since the rate of change of the pulse-width modulated output of flip-flop circuit 6 is proportional to the magnitude of analog input voltage $V_1$.

Finally, as an example of applications in a particular control system, my invention may be employed as an attitude-hold device or electronic servomechanism control system for flight control. In the former case, the attitude gyro pickoff signal is converted to an analog input voltage $V_1$. For synchronization, memory mode switch 13 and feedback switch 8 are both closed. Then, when the memory mode switch 13 is opened, the output of transistor switch 7 remains fixed at its present position and differences between input analog voltage signal $V_1$ and the fixed output voltage signal $V_0$ of the transistor switch 7 produce an error signal at the output of control pulse generator 10 which may be fed into a flight control attitude control loop which comprises another circuit. Logic circuits for indication of particular points such as attitude angles in flight control may conveniently be added by employing simple digital or analog circuitry. Thus, a logic circuit connected to the outputs of the pulse counters can be adapted to indicate when a particular angle is attained, or the output of switch 7 can be compared to a reference voltage representing that particular angle to achieve the same result. Finally, digital or analog limit circuits can be utilized in specific control applications where a driven member has fixed stops or end points in a manner similar to the stops on a servo driven potentiometer. A digital limit circuit would be adapted to compare the outputs of the pulse counters and insure that each time one counter filled up and reset, the other counter was displaced at least eight binary counts therefrom, for example. For operation as an electronic servomechanism control system, both the memory mode switch 13 and feedback switch 8 remain closed, and the counters are driven until no further control pulses are generated.

A digital indication of the follow-up quantity, $V_0$, can be obtained directly from the number of pulses counted in counter 4 at the time the output of counter 5 fills up and automatically resets or changes state. This digital readout at counter 4, therefore, can also be used as an analog-to-digital converter.

Figure 3:
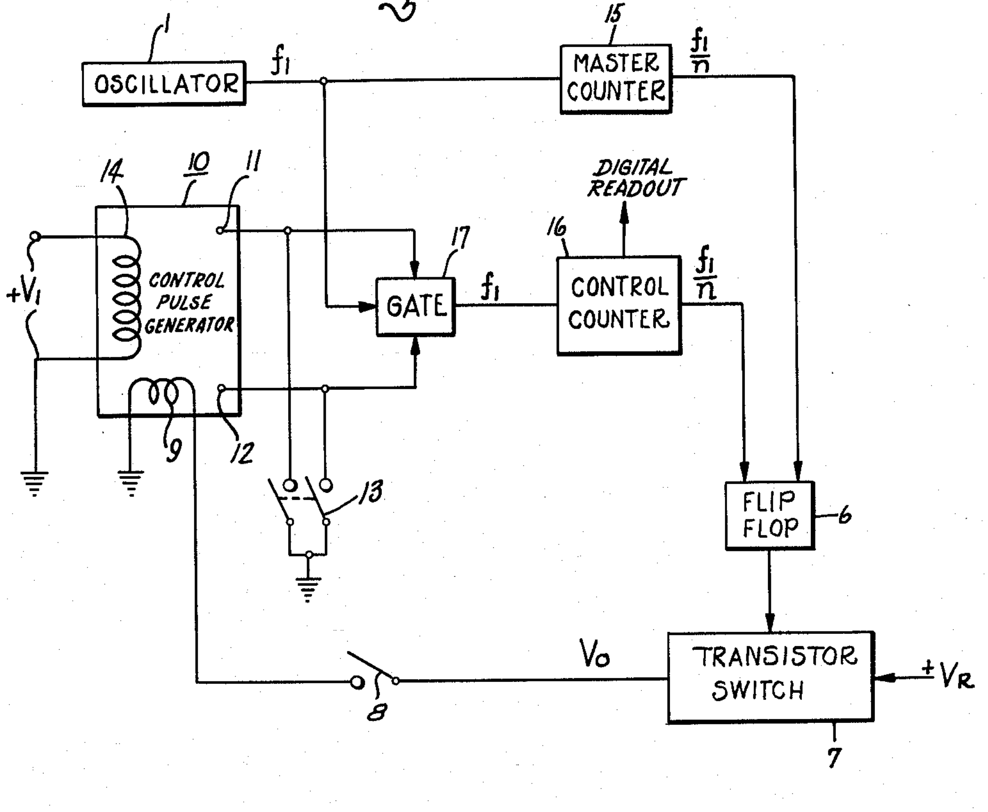
FIGURE 3 is a functional block diagram of a single pulse gate embodiment of a hybrid digital-analog circuit constructed in accordance with my invention.

FIGURE 3 is a block diagram of a circuit very similar to that shown in FIGURE 1 with the exception that a single pulse gating circuit is employed instead of the twin pulse gates shown in FIGURE 1. The system illustrated in FIGURE 3 has an advantage over that shown in FIGURE 1 in applications wherein a system requires several different channels of computation or control. In such cases, only one oscillator and one master pulse counter is required, with an additional control counter circuit for each different channel. Th master pulse counter functions as a reference for the control counters. In FIGURE 3, oscillator 1 is connected directly to an input of a master pulse counter circuit 15, and a control pulse counter 16 is actuated from pulse gate 17 in the manner described for the counters in FIGURE 1. Since only one gating device 17 is employed in FIGURE 3, gate 17 must be adapted to respond to either bipolarity control pulses if control pulse generator 10 is designed to generate them, or to unipolarity pulses if control pulse generator 10 is so designed as previously described. To achieve the function of bipolarity response, gate 17 is adapted to block one or several of the train of $f_1$ pulses from entering the control counter 16 in the presence of a positive control pulse at output terminal 11 of control pulse generator 10 by way of example, and to add pulses to the pulse train of frequency $f_1$ in the presence of a negative polarity control pulse at output terminal 12. Gate 17 is, of course, responsive to control pulses at either output terminal 11 or 12 if the memory mode switch 13 is in an open position as illustrated in FIGURE 3. In like manner, feedback switch 8 can also be connected to function in a signal transmission mode on open switch conditions and grounded signal mode on closed switch conditions. In the arrangement of FIGURE 3, a digital indication of the follow-up quantity can be conveniently obtained directly from the number of pulses counted in control counter 16 at the time the output of master counter 15 changes state. Memory mode switch 13 in a closed position permits the system to function as an analog memory or as an attitude-hold device for flight controls as heretofore described for the applications of the circuit of FIGURE 1.

From the foregoing description, it can be appreciated that my invention makes available an improved hybrid digital-analog electronic circuit wherein are replaced many of the electromechanical components conventionally used in analog computation and control systems and I thereby provide a more reliable and longer life system since no moving parts are used. The electronic components employed in my circuit further have the advantage that their size, weight, reduced power requirements and heat dissipation, and cost, is substantially less than equivalent electromechanical components. Further, the hybrid digital-analog circuit is adaptable to present and future microminiaturization techniques since digital circuits are used. Finally, my invention permits an analog input signal to be converted by simple means to a digital quantity which can be remembered indefinitely without the usual drift problems associated with analog memory. An analog memory is attained by converting the digital memory by means of one transistor switch into a pulse-width modulated analog signal, thereby eliminating the need for elaborate ladder switching networks conventionally used in other forms of digital-to-analog conversion. My invention is not limited to the particular embodiments of the components illustrated, thus the control pulse generator may be constructed of conventional two-junction transistors, unijunction transistors or tunnel diodes, or any form of analog to pulse-width, or even pulse-rate converter.

Thus the generated control pulses may have either variable pulse durations at fixed repetition rates or fixed pulse durations at variable repetition rates. Finally, the various switches such as memory mode switch 13, feedback switch 8 and transistor switch 7, may take the form of diodes, transistors, or tubes.

Having described two embodiments of an improved hybrid digital-analog circuit constructed in accordance with my invention, it is believed obvious that other modifications and variations are possible in light of the above teachings. It is therefore, to be understood that changes may be made in the particular embodiment of my invention described which are within the full intended scope of the invention as defined by the following claims:

What I claim as new and desire to secure by Letters Patent of the United States is:

1. An electronic circuit comprising,
a high frequency pulse source,
two pulse counters, said two pulse counters actuated by the high frequency pulse source to run in synchronism in the absence of any control action,
a pulse gate circuit for rendering one of said pulse counters responsive to an analog input signal to thereby provide a control action, said control action effecting a phase displacement between outputs of the two pulse counters to develop a pulse-width modulated analog signal,
and means whereby said pulse width modulated signal may be transmitted in feedback relationship to said analog input signal.

2. An electronic circuit comprising,
means for generating high frequency pulses,
means for generating control pulses,
means responsive to the high frequency and control pulses for transmitting a first series of low frequency pulses which are a function of the high frequency pulses, and for transmitting a second series of low frequency pulses which are a function of both the high frequency and control pulses,
and means responsive to said first and second series of low frequency pulses for generating a series of pulses having a pulse width determined by a phase relationship between said first and second series of low frequency pulses.

3. An electronic circuit comprising,
a high frequency pulse source,
means responsive to an input signal for generating control pulses having characteristics which are a function of the input signal,
means responsive to the high frequency pulses for producing a first series of low frequency pulses,
means responsive to both the high frequency and control pulses for producing a second series of pulses having the same frequency as the first series and being phase displaced from said first series by an amount proportional to the pulse width of the control pulses,
and means responsive to said first and second series of low frequency pulses for generating a series of pulses having a pulse width and frequency being determined by the phase relationship and frequency of the first and second series of low frequency pulses.

4. A hybrid digital-analog circuit comprising,
means for generating high frequency pulses,
means responsive to an analog input signal for generating control pulses and being operable in one of two modes wherein the first and second modes comprise generating pulses respectively having a pulse duration and frequency proportional to the magnitude of the input signal,
a first means continuously responsive to the high frequency pulses for transmitting a digital signal comprising a first series of low frequency pulses,
a second means continuously responsive to the high frequency pulses and alternately responsive to the control pulses, said alternate response being determined by the operational mode of a switch means connected between the control pulse generating means and said second means, said second means adapted to transmit a digital signal comprising a second series of low frequency pulses having a frequency equal to the frequency of the first series of low frequency pulses and being phase displaced from said first series of pulses by a time interval substantially equal to the pulse duration of said control pulses,
and means responsive to said first and second series of low frequency pulses for generating a third series of pulses having a pulse duration substantially equal to the phase displacement between respective pulses of the transmitted first and second series of low frequency pulses and a frequency equal to the frequency of the transmitted first and second series of pulses.

5. A hybrid digital-analog circuit comprising,
means for supplying a series of relatively high frequency pulses,
means for generating control pulses in response to input analog signals and being operable in one of two modes wherein the first mode comprises generating control pulses having pulse duration proportional to the magnitude of the input signals and the second mode comprises generating control pulses having pulse frequency proportional to the magnitude of the input signals,
a first means for continuously producing a digital signal comprising a first series of relatively low frequency pulses having a frequency directly proportional to said high frequency pulses, said first signal producing means connected to an output of said high frequency pulse means,
a second means for continuously producing a digital signal comprising a second series of relatively low frequency pulses having a frequency equal to that of the first series of produced pulses, said second signal producing means connected to an output of said high frequency pulse means and also intermittently connected to an output of said control pulse generating means, the intermittent connection being determined by the operational mode of a switch device connected therebetween, said second signal producing means responsive to both the high frequency pulses and the intermittently connected control pulses to thereby effect a phase displacement between respective pulses in said first and second series of produced pulses, said phase displacement being a time interval equal to the cumulative effect of the pulse durations of the control pulses,
a means for generating an analog signal comprising a third series of pulses in response to said first and second series of produced pulses, said analog signal generating means connected to an output of the first and second signal producing means, said third series of pulses having pulse durations substantially equal to the phase displacements between respective pulses of the first and second series of produced pulses and a frequency equal to the frequency of said produced pulses,
and means whereby said third series of pulses may be connected as a second input to said control pulse generating means and to become an analog of the input signals to said control pulse generating means.

6. A hybrid digital-analog circuit comprising,
means for supplying a continuous series of high frequency pulses,
means for generating control pulses in response to at least a first input analog signal, said control pulses having a variable ratio of on-time and off-time, said ratio determined by the magnitude and phase relation of the input analog signals,
a first circuit comprising at least a first pulse counter device, said counter device connected to an output of said high frequency pulse means and providing a digital output signal comprising a first series of low frequency pulses having a frequency of $f_1/n$ where $f_1$ is the frequency of the high frequency pulses and $n$ is the number of pulses required to fill up and automatically reset the counter device, a second circuit comprising a pulse gate device and a second pulse counter device, said gate device connected to an output of said high frequency pulse means and to an output of said control pulse means by means of a first switch device, said gate device responsive to either both the high frequency pulses and control pulses or the high frequency pulses alone as determined by the operational mode of said first switch device, output of said gate device comprising pulse trains of said high frequency pulses modified by a pulse adding or subtracting action effected by said control pulses, output of said second pulse counter device providing a digital output signal comprising a second series of pulses having a frequency equal to $f_1/n$, each succeeding pulse of said second series being phase displaced from the respective pulse of said first series by a time interval equal to the cumulative effect of the pulse durations of heretofore generated control pulses, a bistable circuit connected to an output of the first and second counter devices and providing a pulse-width modulated output comprising pulses having pulse durations equal to the phase displacement between respective pulses of said first and second series of low frequency pulses, a second switch device having at least two inputs and an output, output of said bistable circuit connected to a first input, a reference voltage source connected to a second input of the second switch device, output of the second switch device providing a pulse-width modulated analog signal comprising pulses having pulse durations equal to the width of pulses comprising the output of said bistable circuit and having ana mplitude equal to the reference voltage, and a third switch device connected to an output of the second switch device and providing a means for transmitting the pulse-width modulated analog signal in negative feedback relationship to said control pulse generating means as a second input analog signal when said third switch device is in its signal transmitting operational mode.

7. A hybrid digital-analog system comprising, means for supplying a continuous series of high frequency pulses, a first series circuit comprising a first pulse gate device connected to an input of a first counter device, a second series circuit comprising a second pulse gate device connected to an input of a second counter device, output of said high frequency pulse supply means continuously connected to a first input of said first and second pulse gate devices respectively, means for generating control pulses in response to input analog signals and being operable in one of two modes, thereby generating control pulses having either variable pulse durations and fixed repetition rates in the first mode and variable pulse repetition rates and fixed pulse durations in the second mode, the variable pulse characteristic determined by the magnitude and phase relation of the input analog signals, the control pulses being available at one of two output terminals as determined by the polarity of said input analog signals, the two output terminals of said control pulse generating means respectively connected through a mutually coacting switch device to a second input of said first and second pulse gate devices to thereby render only one of said gate devices responsive to both the control pulses and high frequency pulses at one time, the other gate device being responsive to only the high frequency pulses during the corresponding time, output of said first and second counter devices providing digital signals comprising a first and second series of low frequency pulses respectively, corresponding pulses of the two series being phase displaced from each other by a time interval equal to the algebraic sum of the heretofore generated control pulses, a bistable circuit connected to an output of said counter devices and providing a pulse-width modulated output signal comprising pulses having pulse durations equal to the phase displacements between respective pulses of said first and second series of low frequency pulses, a second switch device, output of said bistable circuit comprising a first input to the second switch device, a fixed reference voltage comprising a second input, said second switch device providing a pulse-width modulated analog signal having pulse durations substantially equal to the pulse durations of the bistable circuit output, and a third switch device for connecting an output of the second switch device in feedback relationship as another input to the control pulse generating means during the time said third switch device is in its feedback operational mode.

8. A hybrid digital-analog system comprising, an oscillator for generating a continuous series of relatively high frequency pulses, a first series circuit including a first pulse gate device and a first pulse counter, output of the gate device connected to an input of the counter, a second series circuit including a second pulse gate device and a second pulse counter, output of the second gate device connected to an input of the second counter, output of the oscillator directly connected to a first input of the first and second pulse gate devices, a control pulse generator for generating control pulses in response to input analog signals, said control pulse generator being operable in one of two modes wherein the first and second modes comprise generating pulses having a pulse duration and repetition rate respectively being determined by the magnitude of the input analog signals, the generator provided with two output terminals, control pulses generated by analog signals of one polarity being supplied at one of the terminals and pulses generated by analog signals of the opposite polarity being supplied at the second terminal, a first switch means connected to the output terminals of the control pulse generator, said switch means comprising mutually coacting switch elements whereby the first and second output terminals of the control pulse generator are connected to a second input of the first and second pulse gate device respectively when said switch means is operable in a control pulse transmitting mode, output of said first and second pulse counters comprising two series of relatively low frequency pulses, the respective pulses in the two series being phase displaced from each other by a time interval determined by the control pulses, output of the two pulse counters respectively connected to two inputs of a flip-flop circuit, said flip-flop circuit providing a pulse-width modulated signal comprising pulses having pulse durations determined by the phase displacement between respective pulses of the two series of low frequency pulses, a second switch means provided with two inputs and one output, a source of constant reference voltage connected to one of the inputs of the second switch means, output of the flip-flop circuit connected to the other input, output of the second switch means providing a pulse-width modulated analog signal, and a third switch means whereby said pulse-width modulated signal may be connected in feedback relationship as another input signal to the control pulse generator.

9. A hybrid digital-analog system comprising,
means for supplying a continuous series of high frequency pulses,
a first counter device operable as a master counter,
a series circuit comprising a pulse gate device connected to an input of a second counter device operable as a control counter,
output of said high frequency pulse supply means continuously connected to said master counter and a first input of said pulse gate device respectively,
means for generating control pulses in response to input analog signals whereby the control pulses have variable pulse durations and fixed repetition rates, the variable pulse characteristic being determined by the magnitude and phase relation of the input analog signals, said control pulses available at one of two output terminals as determined by the polarity of said input analog signals,
the two output terminals of said control pulse generating means respectively connected through a mutually coacting switch device to a second and third input of said pulse gate device,
output of the master and control counters providing digital signals comprising a first and second series of low frequency pulses respectively, corresponding pulses of the two series being phase displaced from each other by a time interval equal to the algebraic sum of the heretofore generated control pulses,
a bistable circuit connected to an output of said counters and providing a pulse-width modulated output signal comprising pulses having pulse durations equal to the phase displacements between respective pulses of said first and second series of low frequency pulses,
a second switch device, output of said bistable circuit comprising a first input to the second switch device, a fixed reference voltage comprising a second input, said second switch device providing a pulse-width modulated analog signal having pulse durations substantially equal to the pulse durations of the bistable circuit output,
and a third switch device for connecting an output of the second switch device in feedback relationship as another input to the control pulse generating means during the time said third switch device is in its feedback operational mode.

10. A hybrid digital-analog system comprising,
an oscillator for generating a continuous series of relatively high frequency pulses,
a master pulse counter,
a series circuit including a pulse gate device and a control pulse counter, output of the gate device connected to an input of the control pulse counter,
output of the oscillator directly connected to an input of the master counter and to a first input of the gate device,
a control pulse generator for generating control pulses in response to input analog signals, the pulse duration of the control pulses being determined by the magnitude of the input analog signals, the generator provided with two output terminals, control pulses generated by analog signals of one polarity being supplied at one of the terminals and pulses generated by analog signals of the opposite polarity being supplied at the second terminal,
a first switch means connected to the output terminals of the control pulse generator, said switch means comprising mutually coacting switch elements whereby the first and second output terminals of the control pulse generator are connected to a second and third input of the gate device respectively when said switch means is operable in a control pulse transmitting mode,
output of the master and control pulse counters comprising two series of relatively low frequency pulse, the respective pulses in the two series being phase displaced from each other by a time interval determined by the control pulses, output of the two pulse counters respectively connected to two inputs of a flip-flop circuit, said flip-flop circuit providing a pulse-width modulated signal comprising pulses having pulse durations determined by the phase displacement between respective pulses of the two series of low frequency pulses,
a second switch means provided with two inputs and one output, a source of constant reference voltage connected to one of the inputs of the second switch means, output of the flip-flop circuit connected to the other input, output of the second switch means providing a pulse width modulated analog signal,
and a third switch means whereby said pulse-width modulated signal may be connected in feedback relationship as another input signal to the control pulse generator.

References Cited by the Examiner

UNITED STATES PATENTS

| | | | |
|---|---|---|---|
| 2,865,565 | 12/1958 | Vance. | |
| 3,042,911 | 7/1962 | Paradise et al. | 340—347 |

OTHER REFERENCES

Susskind: Notes on Analog-Digital Conversion Techniques, The Technology Press, page 5—5, 1957.

MALCOLM A. MORRISON, *Primary Examiner.*

C. L. WHITHAN, A. J. SARLI, Jr., *Assistant Examiners.*